J. REINEHR.
IMPLEMENT FOR HANDLING RAILROAD RAILS.
APPLICATION FILED SEPT. 8, 1911.
1,031,964.
Patented July 9, 1912.
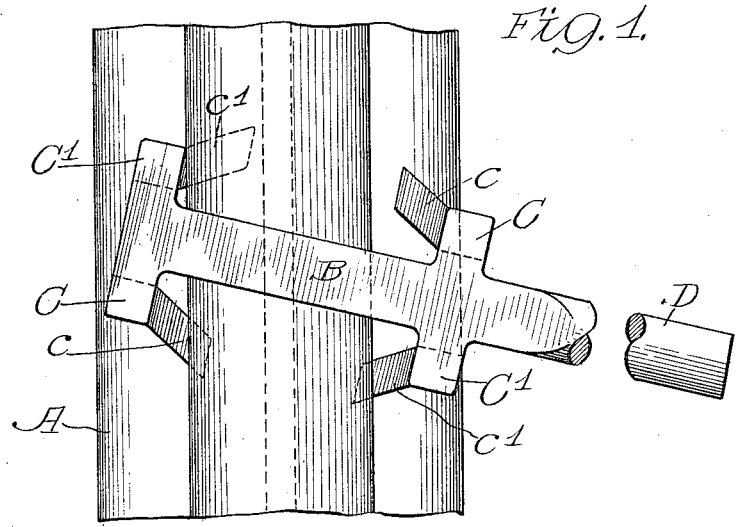
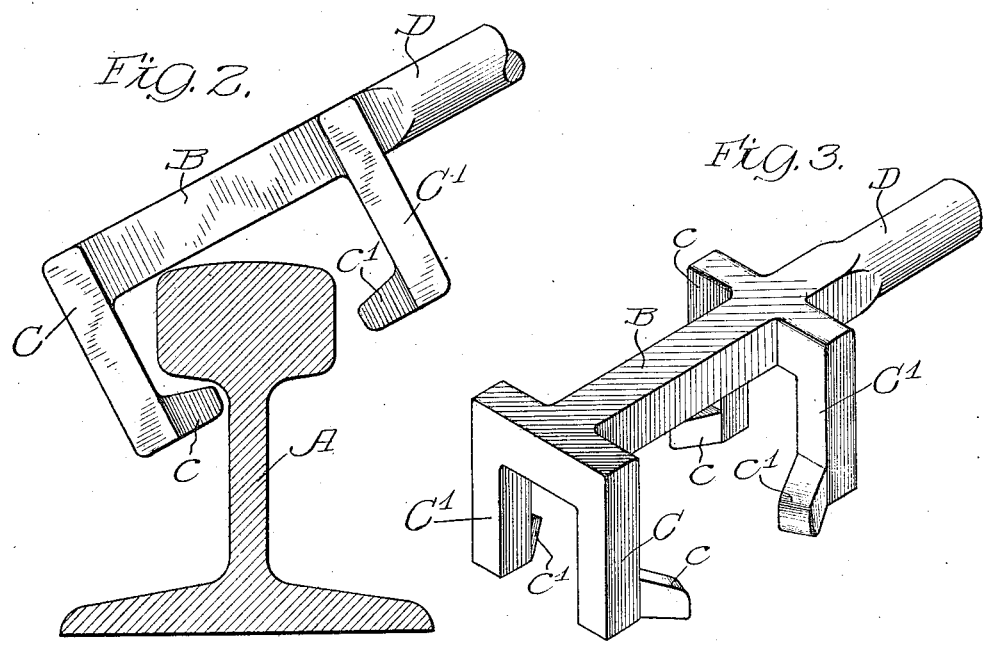

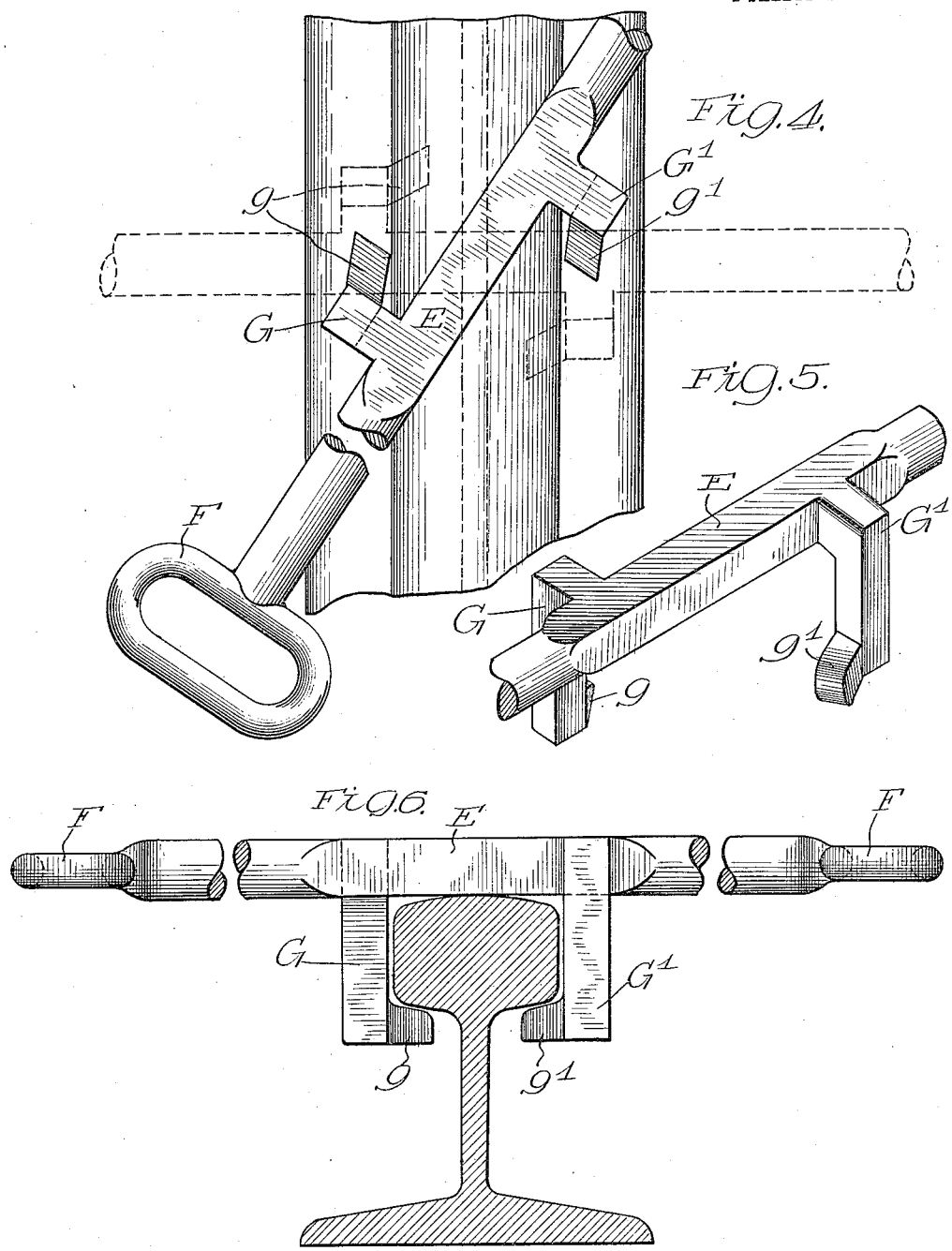

UNITED STATES PATENT OFFICE.

JOHN REINEHR, OF SAVANNA, ILLINOIS, ASSIGNOR TO RAIL LAYING MACHINE COMPANY, OF CHICAGO, ILLINOIS, A CORPORATION OF ILLINOIS.

IMPLEMENT FOR HANDLING RAILROAD-RAILS.

1,031,964.    Specification of Letters Patent.    Patented July 9, 1912.

Application filed September 8, 1911. Serial No. 648,304.

*To all whom it may concern:*

Be it known that I, JOHN REINEHR, a citizen of the United States, residing at Savanna, in the county of Carroll and State of Illinois, have invented certain new and useful Improvements in Implements for Handling Railroad-Rails, of which the following is a specification.

My invention relates to implements for handling railroad rails, and the invention has for one of its primary objects to provide a simple, one piece, cheaply manufactured rail handling implement useful particularly in the operation of laying rails for giving a rail a longitudinal movement, or for canting it, as, for example, when the rail is heeled between the fish plates bolted to a previously laid rail.

A further object of the invention is to so modify the form and construction of the implement characterized above as to adapt it for lifting rails; so as to provide a rail lifting device which will be a substitute for and an improvement upon the ordinary lifting tongs.

The invention is illustrated in two preferred embodiments in the accompanying drawings, wherein—

Figure 1 is a plan view of a heeling implement embodying my invention, the improvement being shown as applied to the rail; Fig. 2, a side view of the implement illustrating the mode of application to the rail, which latter is shown in section; Fig. 3, a view, in isometric perspective, of the said implement; Fig. 4, a plan view of an implement embodying my invention modified so as to adapt it for lifting rails; the view illustrating the application of the implement to a rail; Fig. 5, a perspective view of the implement shown in Fig. 4, and Fig. 6, a side view of the device with the rail shown in section.

Like characters of reference indicate like parts in the several figures of the drawings.

Referring first to Figs. 1 to 3 inclusive, A designates a T section railroad rail. The preferred form of rail handling implement shown in these figures consists of a bar B adapted to extend across the top of the rail formed with the downwardly projecting arms C, C, C', C' provided with lugs c, c and c', c'. The bar B and arms C, C, C', C', form, in effect, a yoke which extends over the ball of the rail. One pair of the lugs c, c or c', c' extends under the ball of the rail when the implement is in operating position. The bar B is extended at one side of the yoke so as to provide a handle D. Preferably the lugs project downwardly, or, what amounts to the same thing, their upper surfaces are inclined downwardly with substantially the inclination of the under surfaces of the ball of the rail. Preferably the lugs are also obliquely disposed with respect to their lateral relation with the bar and project away from the same.

The implement is applied to the rail with the bar at substantially right angles to the rail by being tilted up in the manner shown particularly in Fig. 2. The lugs c, c', at the end of the implement are hooked under the ball of the rail and the implement is then turned into a horizontal position and then, in this position, given an angular movement with respect to the rail forwardly or backwardly so as to bring it into one of the two positions shown in Fig. 1. This movement of the implement wedges the inclined upper surfaces of one pair of the lugs, either lugs c, c or lugs c', c', as the case may be, firmly against the inclined under surface of the ball of the rail so that the implement takes a firm grip on the rail.

In the illustration of the implement given in Fig. 1 it is shown in position to move the rail in a direction toward the bottom of the drawing with one of the lugs c', c' extending completely under the ball of the rail on one side thereof and the other wedged under the ball on the other side as far as it will go. To move the rail in the opposite direction the implement is shifted so that it points toward the top of the drawing which brings the lugs c, c into engagement with the rail.

It will be seen that once having applied the implement to the rail a simple angular shifting position will enable it to grip the rail for movement in either direction. The implement can also be used in canting the rail one way or the other. Therefore it is a very useful device for heeling a rail against another in the operation of laying a railroad track. The reason for providing the implement with the two sets of lugs c, c, and c', c' is simply for the purpose of enabling it to grip the rail for movement in opposite directions. One of these pairs of lugs, and the arms on which they are formed, might be omitted if this double acting feature were not required.

In Figs. 4 to 6 inclusive I have shown an implement provided with only two gripping elements and which, moreover, is modified so as to embody my invention in a device for lifting rails. Referring to these figures, E is a bar formed at each end with a handle F and provided on opposite sides and at different points longitudinally of the bar with the depending arms G, G′ formed with the obliquely disposed lugs $g$, $g'$. The lugs may be brought closer together than the lugs $c$, $c$ of the previously described implement because but one pair is employed. The implement is applied to the rail in an oblique position, as shown by the full lines in Fig. 4, and is then turned to a substantially right angle position, as shown by the dotted lines, so as to bring the lugs $g$ under the ball of the rail. In this position the device may be used as a substitute for the ordinary rail lifting tongs. It is an improvement upon the tongs in that it is more easily applied to the rail and is a one-piece device which can be very cheaply and very strongly made.

While I have shown my invention as embodied in two typical implements of peculiar construction, it will be understood that there might be some deviation from the forms shown without departure from the invention. Therefore I do not limit myself to these particulars except so far as the same are made specifically limitations on certain of the claims herein.

I claim:

1. An implement for handling railroad rails comprising a yoke adapted to extend over and around the ball of the rail provided with four lugs, two on each side of the yoke, which project inwardly, and are obliquely disposed laterally with respect to the yoke.

2. An implement for handling railroad rails comprising a yoke adapted to extend over and around the ball of the rail provided with four lugs, two on each side of the yoke, which project inwardly, and are obliquely disposed laterally with respect to the yoke, and formed with their upper surfaces downwardly inclined.

3. An implement for handling railroad rails comprising a bar providing a handle and adapted to extend across the top of the ball of a rail formed on each side with two depending arms, said arms being provided with inwardly projecting lugs having their upper surfaces downwardly inclined and obliquely disposed laterally with respect to said bar in a direction away from the same.

4. An implement for handling railroad rails comprising a bar adapted, when the implement is in operative position, to extend across the top of the ball of a rail and formed on opposite sides, and at different points longitudinally thereof, with downwardly projecting arms provided at their extremities with lugs arranged so as to project under the ball of the rail in directions obliquely outward from said bar; the bar being extended at one side beyond the lugs so as to form a handle.

5. An implement for handling railroad rails comprising a bar adapted, when the implement is in operative position, to extend across the top of the ball of a rail and formed on opposite sides, and at different points longitudinally thereof, with downwardly projecting arms provided at their extremities with lugs arranged so as to project under the ball of the rail; the bar being extended at one side beyond the lugs so as to form a handle.

JOHN REINEHR.

Witnesses:
P. W. TRUMAN,
L. A. FALKENBERG.

---

Copies of this patent may be obtained for five cents each, by addressing the "Commissioner of Patents, Washington, D. C."